United States Patent [19]

Snow

[11] 4,179,590

[45] Dec. 18, 1979

[54] APPARATUS FOR CONTROLLING RELATED EQUIPMENT AND FOR ENABLING HAND FREE USAGE

[76] Inventor: Milton L. Snow, 150 Fifth Ave., New York, N.Y. 10011

[21] Appl. No.: 863,881

[22] Filed: Dec. 23, 1977

[51] Int. Cl.$^2$ ............................................. H04M 1/05
[52] U.S. Cl. ............................... 179/156 A; 179/1 HS
[58] Field of Search ............. 179/156 R, 156 A, 1 H, 179/1 C, 149, 150

[56] References Cited

U.S. PATENT DOCUMENTS

| | | | |
|---|---|---|---|
| 2,676,213 | 4/1954 | Anderson | 179/156 R |
| 3,179,749 | 4/1965 | Snow | 179/149 X |
| 3,184,556 | 5/1965 | Larkin | 179/156 A |
| 3,440,365 | 4/1969 | Bryant et al. | 179/156 A |
| 3,457,376 | 7/1969 | Kreisel et al. | 179/156 A |
| 3,557,312 | 1/1971 | Vogelman | 179/2 EA |
| 3,971,901 | 7/1976 | Foley | 179/156 A |
| 4,020,297 | 4/1977 | Brodie | 179/156 A |

FOREIGN PATENT DOCUMENTS 1174663  11/1958  France .................................. 179/156 A

OTHER PUBLICATIONS

"Telephone Headsets With a New Look" J. L. Peterson, Bell Laboratories Record, vol. 50, No. 5, May. 1972.
Buckeye Telephone & Supply Co. Adv. in Telephony, vol. 183, No. 23, Dec. 4, 1972, p. 23.

Primary Examiner—William C. Cooper
Attorney, Agent, or Firm—Martin Smolowitz

[57] ABSTRACT

An apparatus for use with or integrally formed of a telephone instrument, where the telephone instrument is thus functional to enable concurrent use and non-use of related equipment. The apparatus has a faceset means formed of a transmitter-receiver unit worn along a user's face for positioning the transmitter in proximity to a user's mouth and the receiver in proximity to said user's ear. A module housing the electrical circuitry controls incoming and outgoing electrical signals to the telephone instrument and transfers these signals between the faceset and the telephone instrument. Hence, the user is able to employ the faceset during a telephone conversation in a hands free manner. A mechanical linkage is formed of the module and serves to actuate the on-off switch of the telephone instrument which is placed in proximity to the module and simultaneously actuating on-off switches in the module to thereby control operation of the faceset and telephone related equipment.

24 Claims, 22 Drawing Figures

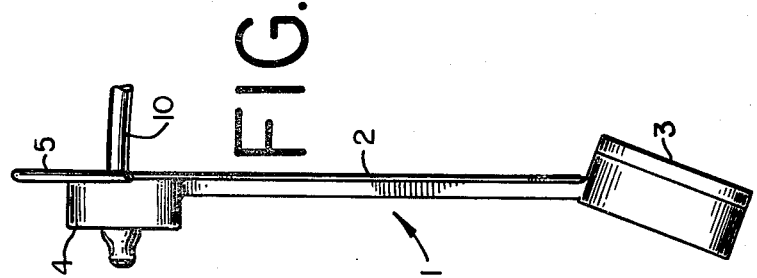
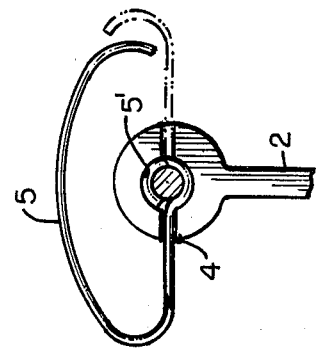
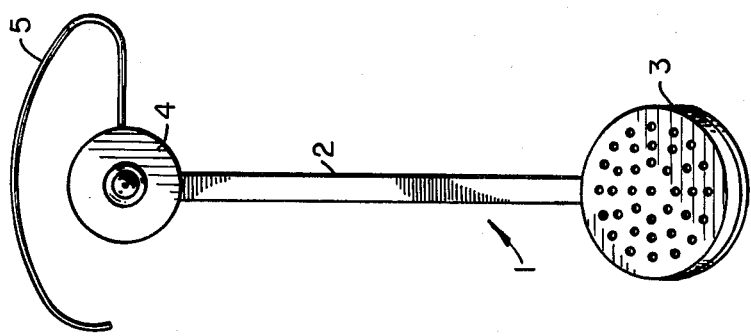
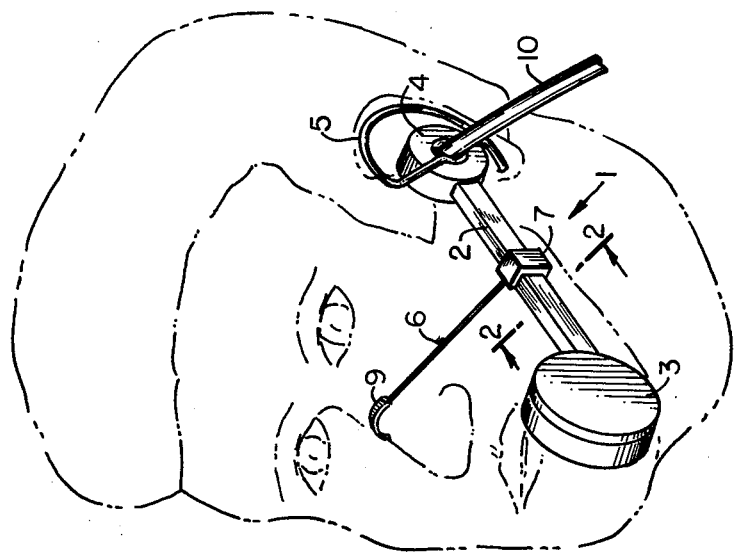
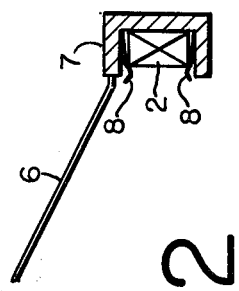

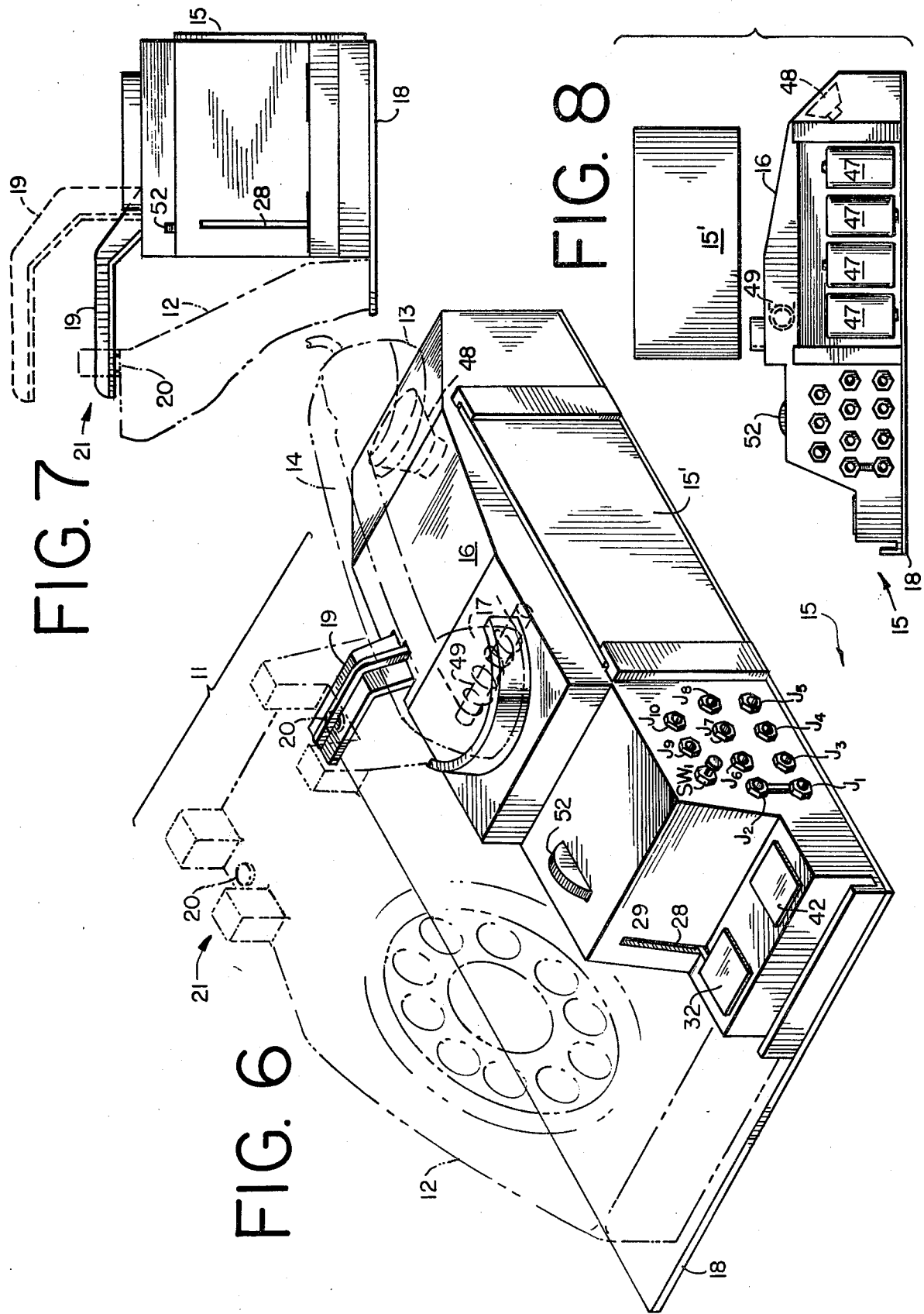

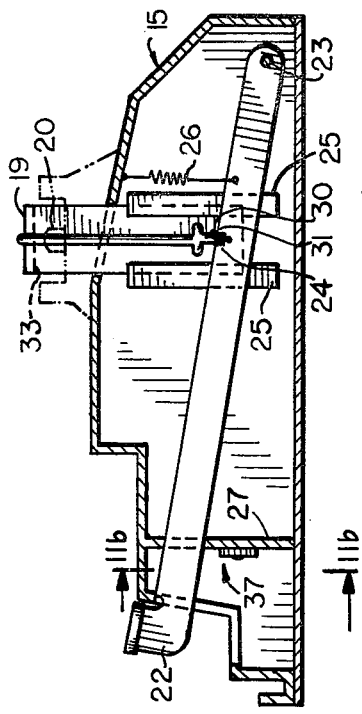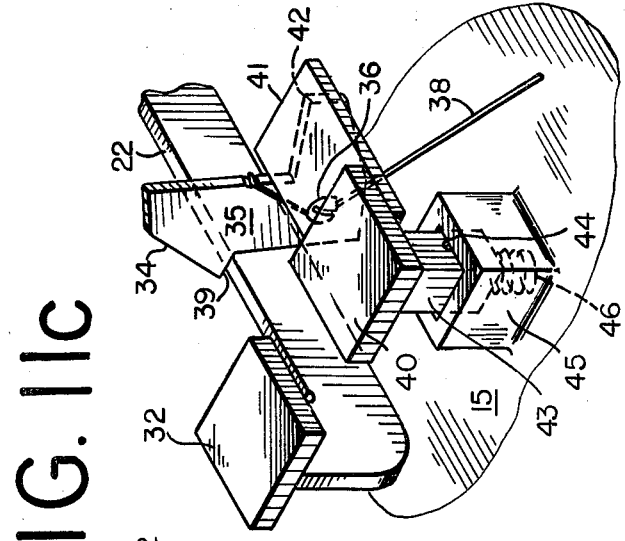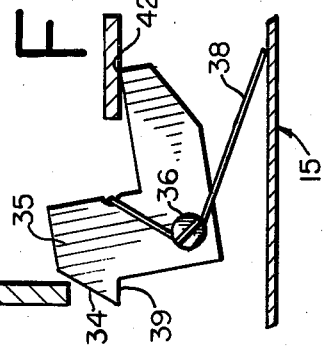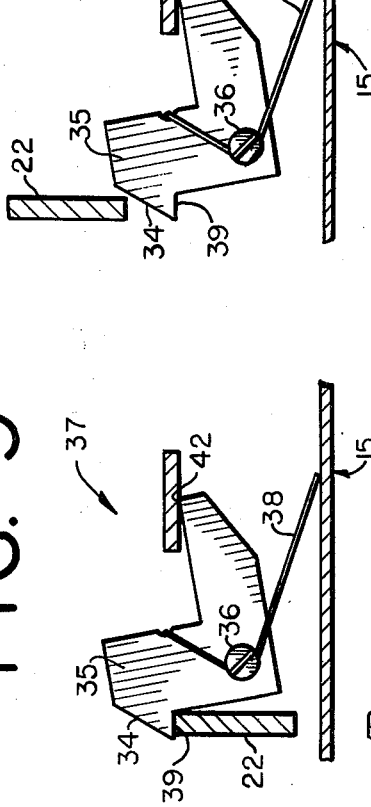

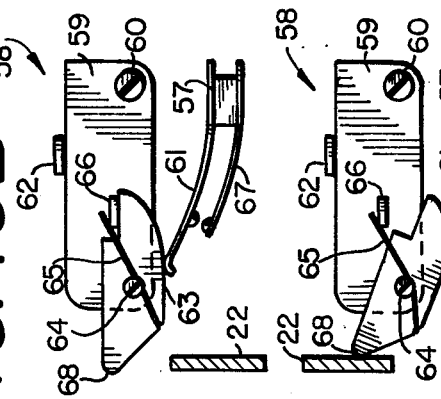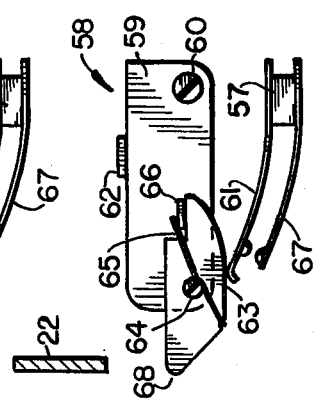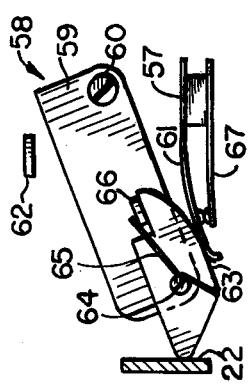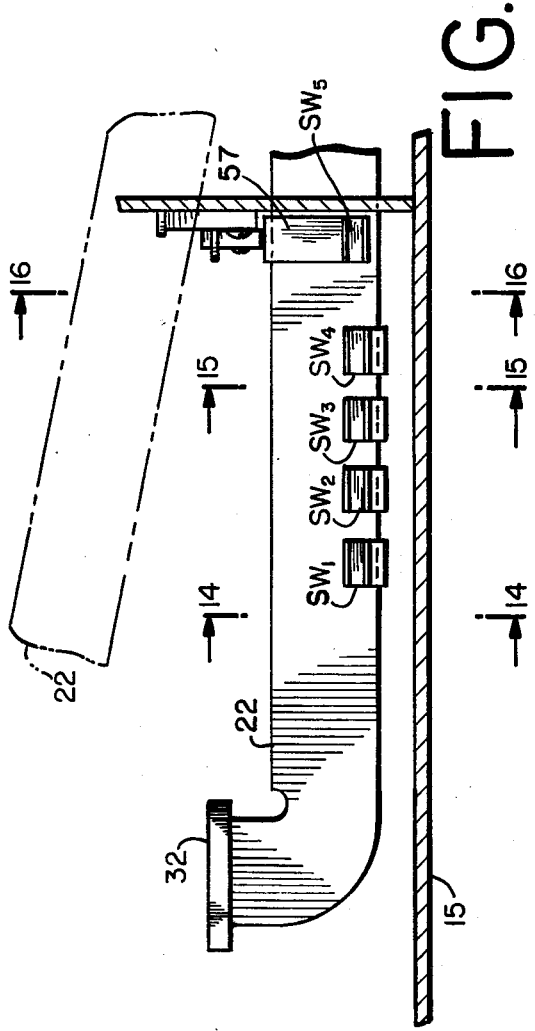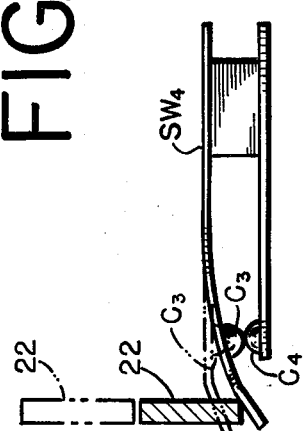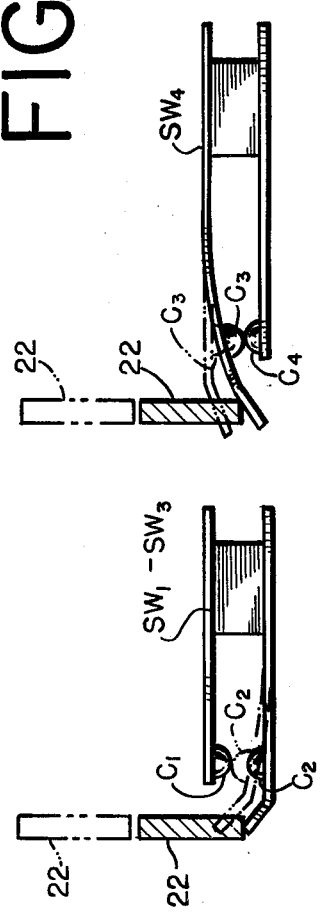

APPARATUS FOR CONTROLLING RELATED EQUIPMENT AND FOR ENABLING HAND FREE USAGE

BACKGROUND OF INVENTION

The present invention is directed to an apparatus which may be operated as auxiliary equipment to, or as an integral part of an ordinary telephone instrument. More particularly, the invention is directed to an apparatus that expands the functions of an ordinary telephone instrument to include controls for the operation of related equipment; and to provide a faceset for using a telephone instrument hands free, thereby eliminating the need to hold a handset or to wear a headset.

As is well known the typical telephone instrument of today consists of a handset and a base.

The handset being the unit that houses:
(1) a sound transmitter whose sensitivity necessitates that it be held in close proximity to the mouth for satisfactory performance. This portion is frequently referred to as the mouthpiece.
(2) a sound receiver which delivers a level of intensity that necessitates it be held in close proximity to an ear. This portion is frequently referred to as the earpiece.

The entire unit containing the mouthpiece and earpiece is referred to as the handset possibly because it is apparently designed to be hand-supported during use. The base is the unit that houses, among other components an "on-off" switch, usually of the gravity type which is activated/deactivated by the absence/presence of the weight of the handset in the cradle. This on-off switch controls the circuitry that enables the components in the handset to function.

Although the present invention is shown as applied to the common "desk-top" or "table-top" type of telephone instrument, it may be made to function with any instrument or device where a transmitter-receiver combination unit requires that it be supported in close proximity to the mouth and/or ear respectively.

During actual use of the telephone instrument, the handset is raised from a cradle on the base and held in the hand in close proximity to the face for contact with the ear and the mouth at the respective ends of the handset. This enables the user to talk into the transmitter at the mouth portion and to receive incoming signals by way of the receiver in the ear portion. Once the handset is removed from the cradle, the plunger buttons projecting from the base are in the fully extended position activating associated circuitry such that any incoming signals to the receiver and outgoing signals to the transmitter are operative. As previously mentioned, the plunger buttons which are part of the switch hook are designed to be depressed by the sheer weight of the handset resting the cradle of the base of the telephone instrument.

Associated with the concept of using the conventional telephone instrument is the need for its user to employ one hand, and many times the other hand, for holding the handset. This automatically limits the ability to carry on other activities during a telephone conversation; and introduces the element of fatigue and discomfort by reason of the holding process.

The prior art has considered diverse means for overcoming these problems, but up until the present time, such arrangements have exhibited shortcomings. For example, in U.S. Pat. No. 3,179,749 the handset is placed in a receptacle which must be positioned in proximity to the user, and in turn be confined within close proximity to the receptacle. Some additional available devices known from the prior art employ alternate approaches none of which exhibit the favorable characteristics of the present invention.

In all instances, these arrangements exhibit shortcomings which in some fashion limit the ability for the user to feel fully free in carrying out his other activities while engaging in the telephone conversation. Such prior art equipment as was intended to free the arm from holding the handset requires the use of cumbersome auxiliary equipment, substantial amounts of wiring and the like, and nonetheless fails to provide the necessary flexibility, where the user feels he is tied to the auxiliary equipment and must remain within a fixed distance from such equipment.

Also known are outgoing devices which employ microphones at distances from the user's mouth that have exhibited shortcomings, such as: the need to shout to compensate for distance; lack of clarity, intensity and quality of voice . . . similar to that as heard in a tunnel; inability to maintain privacy when desired; etc.

SUMMARY OF INVENTION

Accordingly, it is the main object of the present invention to overcome the defects of the prior art.

A further object of the present invention is to provide means whereby a faceset can function in lieu of a hand supported or a head supported voice transmitter/receiver combination unit.

Still another object is to employ means to include apparatus to operate the on/off switch in the base of the telephone instrument in lieu of the weight of the handset ordinarily used for that purpose.

A further object is to provide electronic circuitry whereby a low volume sound level of the signal delivered to an earpiece may be made variable to volume sound levels to suit the user.

Still another object of the present invention is to provide means whereby related devices and equipment can be readily activated/deactivated in concert with use and nonusage of the telephone instrument.

The invention will be best understood from the accompanying specification, claims and drawings wherein:

IN THE DRAWINGS

FIG. 1 is a pictorial view of the faceset of the inventive apparatus as worn by user.

FIG. 2 is a sectional view taken along line 2—2 of FIG. 1 illustrating the positioning member along the connecting bar.

FIG. 3 is a front elevational view of the inventive faceset.

FIG. 4 is a side elevational view of the inventive faceset.

FIG. 5 is a front view of the earpiece illustrating an alternative position for the ear support.

FIG. 6 is a perspective view of a telephone instrument employed with a module portion of the present invention.

FIG. 7 is a front view of the module portion as shown in FIG. 6.

FIG. 8 is a side view with the side cover of the module removed.

FIG. 9 is a side cross sectional view of the module portion of the invention with the telephone instrument in the non-use position.

FIG. 10 is another view of FIG. 9 with the telephone instrument in the use position.

FIG. 11a is a cross-sectional view along line 11a—11a in FIG. 9 illustrating the elongated arm in the latched position.

FIG. 11b is a cross-sectional view along line 11b—11b in FIG. 10 illustrating the path of travel of the elongated arm upward from the latched to the delatched position.

FIG 11c is a cross sectional view of the elongated arm in the de-latched position.

FIG. 12 is a partial view illustrating the elongated arm in the latched position and an associated release member in the normal position.

FIG. 13 is a partial side view of the elongated arm and associated switches.

FIG. 14 is a sectional view taken along line 14—14 of FIG. 13 illustrating switches that are normally in a closed position.

FIG. 15 is a view similar to FIG. 14 with the switch in normally open position.

FIG. 16 is a sectional view taken along line 16—16 in FIG. 13 illustrating a switch and associated elongated arm in the delatched position.

FIG. 16a is another view of FIG. 16 with the arm in the process of being lowered.

FIG. 16b is another view of FIG. 16 with the arm in the latched position.

FIG. 16c is another view of FIG. 16 with the arm in process of going up.

DESCRIPTION OF INVENTION

Figure 17:
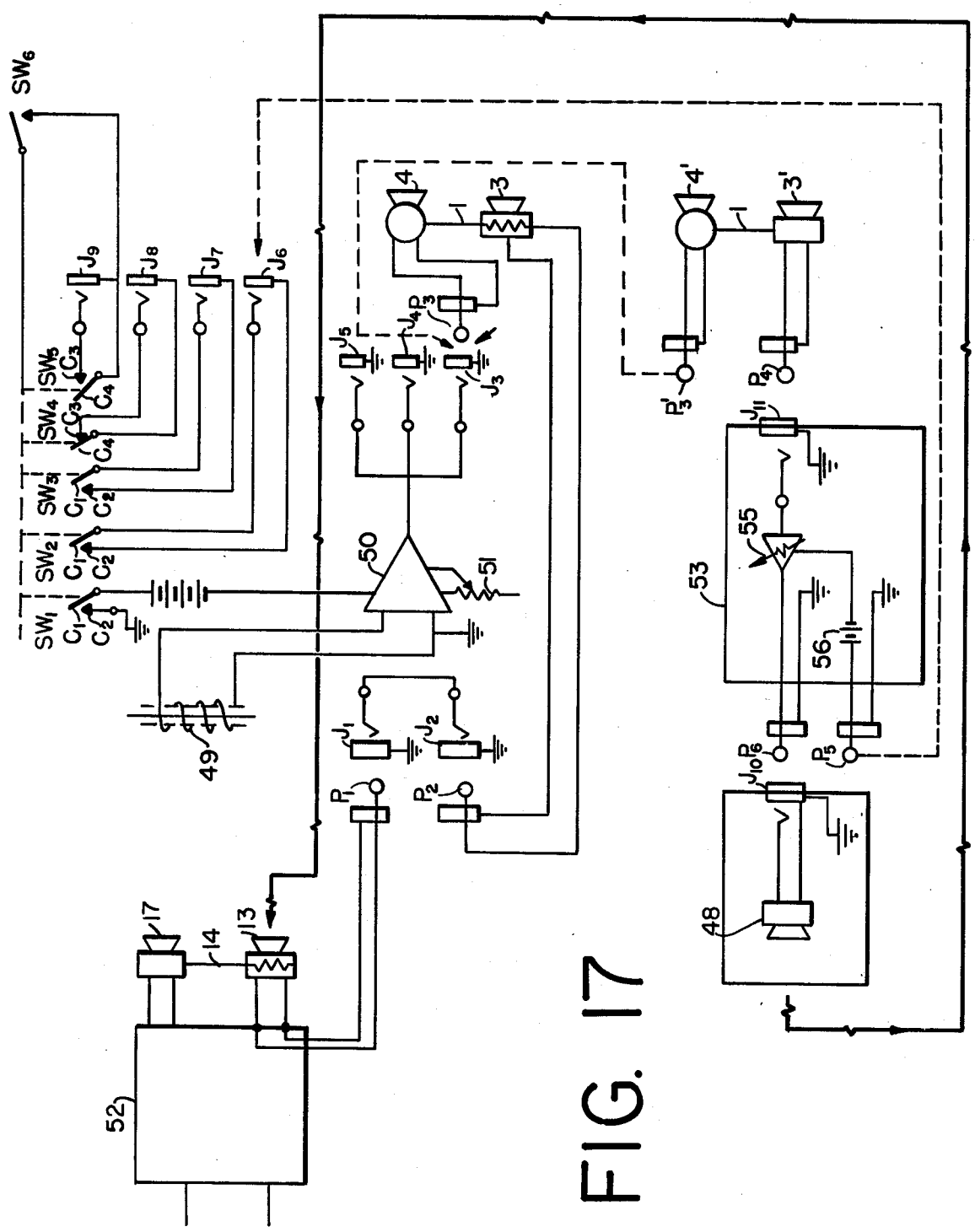
FIG. 17 is a schematic drawing of the associated circuitry.

The present invention basically comprises two distinct elements (see FIGS. 1–8) which cooperate to provide the user with a simple and efficient means for using a telephone instrument while wearing a miniaturized, lightweight faceset in lieu of holding the familiar handset which is larger and heavier. The faceset is electronically compatible, and is operational at the same time, as is the handset thus offering the user a choice if desired. The faceset is a miniaturized transmitter/receiver unit which is designed to be worn along the user's face in a manner that places the receiver on the ear and the transmitter near the mouth.

In this regard, a basic module is employed containing means by which the incoming and outgoing signals normally associated with the conventional telephone instrument are controlled to enable the user to carry out his conversation by means of the miniaturized faceset; this taking place with convenience and comfort, while at the same time freeing both hands for any additional activities concurrent with the telephone conversation. The miniaturized, lightweight faceset performs better than the ordinary handset part of the conventional telephone instrument since the wearing position of the faceset maintains a fixed close proximity between the transmitter and the mouth, as well as between the receiver and the ear. Also provided is the ability to adjust the sound level delivered to the ear.

As shown in the accompanying FIGS. 1–5 the miniaturized faceset 1 consists of an elongated bridging member 2 which bridges the mouthpiece 3 to the earpiece 4 along the user's face. As shown, the bridging member 2 is of a sufficient length that the earpiece 4 and the mouthpiece 3 are disposed in proximity to the ear and to the mouth, respectively, so as to enable normal telephone conversation to take place. Furthermore, the earpiece 4 is provided with a contoured member 5 (see FIG. 3) emanating therefrom, which is curved to allow the earpiece 4 to rest confortably in proximity to the ear, as the contoured member 5 sits behind the ear lobe as a support. The contoured member 5 is positionable as in FIG. 5, to be oriented so as to fit on either the left or right ears respectively by reversing orientation about pivot 5. This contoured member 5 acts to support the faceset 1 at one end and is formed of a flexible material, such as a wire of sufficient rigidity, to enable the user to bend and adjust same to seat comfortably behind the ear.

Extending from a portion of the elongated bridging member 2, is a transverse support member 6, as shown in FIG. 1., which radiates from the bridging member 2 toward the user's nose. The support member 6 is affixed to a member 7 which may be slidable along the bridging member 2 which may be rigid or flexible for proper positioning. According to FIG. 2, a spring member 8 may be disposed within member 7 and serves to engage the support member 6 along a designated position thereon. This permits adjustment of support member 6 along bridging member 2 for the convenience of the user. Support member 6 is of a sufficient length to seat at its free end by means of a concave member 9 resting on the user's nose. This support member 6 is formed of a material such as a bendable wire or flat strip, and has sufficient flexibility to be contoured along its length to fit closely to the cheek and nose portions of the face respectively, so as to achieve comfort and not interfere with the user's vision. Furthermore, at its free end, member 9 is so shaped to comfortably fit and positively engage the nose. The transverse support 6 held by bridging member 2 maybe removable from the bridging member 2 and can be positioned to act and extend from either the right or left side depending upon which side the user is employing the miniature faceset 1.

In addition, where the user may wear eyeglasses, the support 6 may be further positioned and thusly removed from the nose and directed upwardly for positioning on an eyeglass frame temple—to provide the necessary support of the faceset 1 as the eyeglass frame provides the necessary nose support.

The miniature faceset is provided with a plurality of wires, of which two serve the mouthpiece; and two serve the earpiece, which wires are shown at 17. The wires that emanate from the mouthpiece 3 are connected to the terminal interior of the base 12 of telephone instrument 11 (see FIG. 6) identically to where the wires that emanate from mouthpiece 13 of handset 14 are connected, so as to transmit a signal into telephone base 12.

In turn, the wires leading from earpiece 4 of miniature faceset 1 are connected to an amplifier where the signal is amplified in a fashion as will be described hereinafter.

It is important to realize that the inventive faceset 1 is basically intended to be placed in proximity to the user's face, per FIG. 1, where the spatial relationship of the mouthpiece 3 to the earpiece 4 is such that the elongated bridging member 2 serves as the link therebetween. The support member 6 is intended to provide the necessary support for the positioning of the miniaturized faceset at one end, while the contoured member 5 performs an identical function at the other end. Therefore, at all times the faceset 1 will remain in a proper position with respect to the user's mouth, and ear. As previously mentioned, the contoured member 5 is adjustable by the appropriate flexure of its curvature so as to suit the contour of the user's ear, enabling proper positioning of the faceset 1.

FIG. 6 illustrates the module 15 which acts upon both the instrument base 12 and handset 14 and will be described hereafter. The module 15 is a self-contained unit which has a number of elements that cooperate with the telephone instrument 11 to enable the miniature faceset 1 to operate. The module is so formed that the handset 14 is intended to be laid to rest upon a platform 16 of the module 15 where the transmitter 13 of the handset 14 is at a designated location and receiver 17 at another location. As will be explained hereafter, the module 15 is comprised of designated components which function in conjunction with the telephone instrument 11 permitting the miniature faceset 1 worn by the user to operate without the need for further handling of telephone instrument.

In actual operation, the handset 14 is first placed on platform 16 so as to be in close proximity to module 15 (see FIG. 6). The base 12 of the telephone instrument 11 is placed on a stand 18 of the module 15 beneath extendable arm 19 as shown by the broken lines of arm 19 in FIG. 7. Now the inventive apparatus is ready for operation. As will be explained in more detail hereinafter, the extendable arm 19 is caused to move downwardly per solid line position in FIG. 7, and the switch hook or pins 20 as shown in FIG. 6, are urged to travel downwardly. The extendable arm 19 radiating from the module 15 is so operable to take the place of handset 14 which normally sits on cradle 21 and engages switch hook 20. Under such conditions an incoming call to the telephone instrument 14 will be received as if handset 14 is at the rest position on cradle 21 and the switch hook is depressed. Likewise, the extendable arm 19 may be urged upwardly to cause switch hook 20 to elevate as if the handset 14 were removed from the cradle 21 of the base 12.

In FIG. 9 the elongated lever arm 22 is at the rest position. The arm 22 is pivotally mounted at 23 and is spring connected to extending arm 19 through spring 24. The arm 19 is vertically slidable in guides 25. Furthermore, arm 22 is biased upwardly through spring 26. The arm 22 is latched when in the rest position by latching assembly 37 mounted to partition 27 within the housing of module 15. By way of further explaining this function of arm 19, it moves in response to the actuation of elongated arm 22. As previously mentioned, extending arm 19 is intended to act upon the switch hook or pins 20 of the telephone instrument 11 in lieu of the conventional handset 14.

Initially the base 12 is placed adjacent the module 15 with the extending arm 19 disposed over the switch hook 20 as shown in FIG. 10. The arm 22 is maintained in upward position by spring 26. The free end of arm 22 moves upwardly and downwardly within a slot 28 (see FIG. 6). In the uppermost position arm 22 is so maintained by spring 26 which permits upward movement until barrier 29 of slot 28 is reached.

Spring 24 maintains the extending arm 19 in contact with arm 22 at point 30, bearing against point 31 on arm 22. Thusly, arm 19 is also urged to maintain an upwardly position by spring 26.

Once the user seeks to employ the invention, the arm 19 is caused to move down by actuating button 32 (see FIG. 12) and so depressing same until elongated arm 22 latches in its most downward position by latch assembly 37. During this downward motion of arm 22, it initially causes arm 19 to move in concert via spring 24. At some point in its downward movement of arm 19, surface 33 of arm 19 contacts and fully depresses switch hook 20. Continuing downward movement of arm 22 into the latched position causes spring 24 to elongate because arm 19 is prevented from further downward movement by engagement with the cradle 21 of the instrument 11.

The latching operation is shown in FIGS. 11a–c. Initially per FIG. 11b the arm 22 is shown de-latched. As arm 22 is urged downwardly (see FIG. 11c) it contacts sloping surface 34 of latch 35 and rotates the latch clockwise about pin 36. A torsion spring 38 serves to bias latch 35 in a counter clockwise direction. As arm 22 continues its downward travel it passes the end of sloping surface 34 and engages the lip 39 as shown in FIG. 11a. The spring 38 maintains the latch 35 in the position to prevent arm 22 from raising. This is latched position. To release the latch 35, the button 40 (see FIG. 12) is depressed causing the plate 41 attached thereto, to impart a downward force on point 42 of latch 35 (see FIG. 11c) of sufficient magnitude to de-latch and separate arm 22 from lip 39. The button 40 is affixed to a shaft 43 which is constrained to move in a channel 44 formed of boss 45. The shaft 43 is biased upwardly by spring 46. After de-latching as described above, arm 22 moves upward under action of spring 26 to cause arm 19 to release the switch hook 20 as described above.

The module 15 has a slidable panel 15' and contains the necessary actuating elements and electrical circuitry for introducing into and out of electrical circuit relationship the various electrical signals that are necessary for providing the multiplicity of functions to the present invention.

More specifically, module 15 as shown in FIGS. 6 and 8 houses a plurality of input and output jacks J1, J2, J3, etc. and switches SW1, SW2 (see FIG. 17) etc. as will be described hereafter, a source of electrical energy, i.e. a plurality of batteries 47 for the associated circuitry; a speaker 48 mounted beneath the module platform 16 in proximity to the location where the transmitter 13 of the instrument hand set 14 is at rest; an induction coil 49 (see FIG. 17) is also beneath the platform 16 and is disposed in proximity to the receiver 17. As illustrated in FIG. 17, an amplifier 50 having an associated potentiometer 51 is in circuit relation to the aforementioned elements is employed for handling electrical signals into and out of the inventive hand set 1.

In the mode of operation according to FIG. 6, the telephone instrument 14 is placed on the module 15 with the transmitter 13 on the platform 16 positioned above the speaker 48 and the receiver 17 on the platform above induction coil 49. The base 12 of the instrument 11 is placed on stand 18 which forms the lower part of the module 15 and actuating of button 32 in a downward direction causes the switch hook 20 to be depressed through the action of extendable arm 19 as has been explained hereinbefore.

The circuitry forming part of the present invention (see FIG. 17) involves the use of an induction coil 49 connected to amplifier 50 which is energized through batteries 47 by actuation of SW1. The voice signal received in the receiver 17 of set 14 is picked up by the coil 49 and transmitted to amplifier 50 and provides an output signal to jacks J5, J4 and J3. The intensity of the output signal of amplifier 50 can be varied in accordance with a setting of potentiometer 51 in circuit relationship therewith through adjusting wheel 52 (see FIG. 6).

As shown in FIG. 13, the lever arm 22 is illustrated in two positions. The broken line position represents the arm 22 in the delatched position; whereas, the solid drawing of arm 22 represents the latched position.

Actuation of the five switches SW1-SW5 is caused by the movement of arm 22. SW1, SW2, SW3, are leaf type switches and move from a closed to an open contact state when the lever arm 22 moves downward as shown in FIG. 14 thereby causing contacts C1 and C2 to open. SW4 is a leaf type switch which changes from an open to a closed state, as shown in FIG. 15, when lever arm 22 moves downward thereby, causing the contacts C3, C4 to close. SW1-SW4 maintain a new contact position when arm 22 is latched. FIGS. 14-15 illustrate the movement of the leaves mounting the switch contacts in response to the action of arm 22.

FIG. 16 illustrates switch SW5 in the open state with lever arm 22 in the delatched position. FIG. 16A shows lever arm 22 moving from the delatched position to the latched position. FIG. 16B illustrates lever arm 22 in the latched position. FIG. 16C illustrates the lever arm 22 proceeding upward from the latched to the delatched position.

The switch assembly SW5 comprises a switch 57, of a leaf type, with an actuator 63. The actuator 63 is pivotally mounted at 64 on arm 59 which in turn is pivotally mounted at 60. Leaf 61 of switch 57 biases actuator 63 against stop 66, the stop 66 in turn is affixed to arm 59. Thusly, arm 59 is urged upward against stop 62. Further biasing of actuator 63 against stop 66 is carried out by torsion spring 65 biasing actuator 63 against stop 66. According to FIG. 16 as lever arm 22 descends, it contacts end 68 of actuator 63 and continued movement of lever arm 22 per FIG. 16a (downward) toward the latched position, causes actuator 63 to move downward and urges arm 59 to move downward and pivot about point 60. In this operation, actuator 63 causes leaf 61 to make contact with leaf 67 and switch 57 of switch assembly SW5 is closed. Continued movement of lever arm 22 as shown in FIG. 16b causes it to move into the latched position and permits actuator 63 to return to its rest position as the tension of leaf 61 which is biased upwardly, returns to its rest position free from contact with leaf 67, leaving switch 57 of switch assembly SW5 in an open state.

In moving lever arm 22 from the delatched to the latched condition, the switch SW5 momentarily closes. In proceeding from the latched to the delatched condition as shown in FIG. 16c, the lever arm 22 contacts the end of arm 63 causing it to rotate clockwise. Since arm 59 is blocked by stop 62 from moving upwardly, arm 63 must rotate about pivot 64 allowing lever arm 22 to pass by arm 63 without movement of arm 59. Torsion spring 65 returns arm 63 to the normal position as lever arm 22 moves into the delatched condition. In this fashion lever arm 22 returns to the delatched condition without actuating switch 57.

Jack J3 is an output jack which is engageable with plug P3 that in turn is connected to the earpiece 4 of the inventive faceset 1. Since J1 and P1 as well as J2 and P2, are engaged respectively, a parallel talk path has been established from the mouth piece 3 to the telephone instrument 11 which is bridged to terminals connecting transmitter 13 of handset 14 in base 12. A received signal from receiver 17 is directed through coil 49 to amplifier 50 and through J3 and P3 to earpiece 4. Volume control 51 governs the voice level into the earpiece 4. Jack 4 may be employed to connect into an auxiliary speaker (not shown) through a suitable plug, whereby the voice received in the handset 14 provides a signal which is picked-up by coil 49, amplified and transmitted as an output signal into an auxilliary speaker plugged in J4. The jack J5 provides an input signal for a tape recorder or for a conference call which will (depending on the connection out of J5) permit the recording of a message simultaneous to the carrying on of a conversation, or also would permit the input signal to a conference call unit where a multiple discussion may be had.

As previously mentioned, SW1 actuation, control the jacks J3 through J5 which are bridged together.

Jacks J1 and J2 are bridged to one another and serve to enable connection of the mouthpiece 3 of the inventive faceset 1 with the terminals in base 12 that are connected to transmitter 13 of handset 14. Jack J1 is engaged by P1 which is directly connected to the telephone instrument 11. The signal out of P1 is transmitted to terminals in base 12, which terminals are connected to mouthpiece 13. Once P2 which connected to the mouthpiece 3 of the inventive faceset 1, engages J1, the voice signal from the faceset 1 is transmitted directly to telephone instrument 11. The use of bridged jacks J1 and J2 provides a convenience connection and serves to blend into one centralized panel for connections.

In other words, the spoken word through inventive faceset mouthpiece 3, which houses microphone, i.e. a carbon microphone is transmitted from the mouthpiece and into J2 through P2 and then is transmitted through P1 (being connected to J1) and to the telephone instrument 11 for transmission elsewhere.

The module also contains jacks J6, J7, J8, J9 each of which are, respectively, in electrical circuit relation with associated switchs SW2, SW3, SW4 and SW5. These jacks provide the means by which auxiliary services may be incorporated to function with the telephone. The contacts of SW2-SW5 are actuated in response to the movement of lever arm 22 as described above.

The jack J9 is controlled by switch SW5, and is designed for use with a plug that connects to a date-time recording machine. As previously explained, SW5 will be actuated on the downward stroke of lever arm 22 that simultaneously causes extending arm 19 to depress switchhook 20, consequently the date-time recording machine is activated to stamp the time when a telephone call is terminated. Because toll charges based on time do not begin the moment switchhook 20 rises—as there is no charge for time to dial, nor for wrong number calls, nor for calls involving intercept operators, nor for calls with telephone company operators, nor for calls involving telephone company business, no-answer calls, etc. etc.—switch SW6 is a momentary type, that may be depressed by the telephone user to activate the date-time recording machine to stamp the time when it is determined the timing should commence (distant party answers, etc.). Switch SW6 is bridged to SW5, (see FIG. 17) and is located on the panel of module 15 that houses jacks J1 through J10 (see FIG. 6).

Jack J8 is connected to switch SW4, FIG. 15 (already described) and serves to accomodate a plug connected to a speaker of a radio, television or of some other "loudspeaking" unit. In raising the position of lever arm 22 which enables switchhook 20 of the telephone instrument to rise (phone turned "on"), the switch SW4 is placed in the open state automatically causing the radio, television, etc. to become silent. Conversely, lowering lever arm 22 to turn the telephone instrument off, will cause switch SW4 to be in the closed state, automatically restoring the sound from the radio, television, etc.

Jack J7 is designed to accommodate a plug connected to a voice recording machine, and connected to switch SW3 per FIG. 14, for use to automatically "start" and "stop" the motion of a voice recording machine as the phone is "answered" and "hung up" respectively. Downward movement of the switchhook 20 through movement of lever arm 22 causes contacts C1 and C2 of switch SW3 to open, simultaneously stopping the motion of the recording machine. Obviously, the reverse process causes the contacts of switch SW3 to close, simultaneously putting the recording machine in motion.

Jack J6 is connected to switch SW2 and is designed to operate in a manner identically to that of switch SW3 explained above. However, jack J6 is intended to serve as an on/off switch for the operation of an independent voice transmitter 53, to be discussed hereinafter.

Jack J10 (see FIG. 6) is connected to speaker 48 and is intended for a plug that is connected to a source of sound to be directed to mouthpiece 13 of handset 14 resting on platform 16. Sound may be to and from one or more nearby telephones, a voice transmitter (to be discussed hereinafter), background music, etc. Jack J10 also can be made to connect to a junction box whereby two or more nearby telephones can be united in a joint conference. In this situation, a connection is established between J4 or J5, see FIG. 17, of each telephone to be involved and fed into a junction box as a common input; and in turn is connected as a common output to jack J10 of each of the involved modules 15 (telephones), see FIG. 6. In this manner, the telephone user can simultaneously talk to each of the connected telephones; and each of the telephones in turn can be directing conversation to the telephone user and the other telephones at the same time.

The present invention also contemplates an alternate embodiment (see FIG. 17) which does not necessitate the need for connecting the inventive faceset 1 to the telephone instrument 11 by wire as mentioned hereinbefore; the broken line connections of FIG. 17 are employed in this instance. In this regard, a transmitter 53 employing an input jack J11 connected to amplifier 54 has a potentiometer 55 and a source of electrical energy 56 associated therewith. The inventive faceset 1 in this instance employs a mouthpiece 3' formed of a microphone i.e. a dynamic microphone, that is connected by P4 to J11, so that the signal from mouthpiece 3' is fed to transmitter 53 through amplifier 54 and out to P6, which is connected into speaker jack J10 and also connected to speaker 48 disposed in module 15 beneath the transmitter 13 of the handset 14 resting on the module. The potentiometer 55 serves to adjust the output level of speaker 48 as it transmits the voice out of handset 1 directly into transmitter 13 of the handset 14 which is disposed on the platform 16.

Sound is received by the user of faceset 1 in a fashion identical to that set forth in the first mentioned embodiment namely, the voice signal is picked up from receiver 17 and directed through an induction coil 49, is them amplified by amplifier 50 and is transmitted through the output jack J3 directly through plug P3' connection the earpiece 4' of the inventive faceset 1. The module 15 is provided with a jack J6 which is connected with P5 leading from the source of electrical energy 56 of transmitter 53. After plug P5 is connected to jack J6, the transmitter is actuated by switch SW2 in a manner previously described.

The embodiment employing transmitter 53 enables the use of the inventive faceset 1 without the need for any wired connection into the telephone instrument 11.

In conclusion, the present invention is directed to an apparatus which may be operated as auxiliary equipment to, or as an integral part of, an ordinary telephone instrument. More particularly, the invention makes possible the following features:

1. A lightweight, miniaturized receiver-transmitter unit that can be conveniently "worn" by user, thereby obviating the need to "hold" a weighty telephone handset, or to wear a headset.
2. A mechanism to depress-release the on-off switch; thereby eliminating the need to remove/replace the handset for that purpose.
3. Associated electronic circuitry enabling the user to regulate the amplitude of the incoming sound; the transmission of sound to a tape, or other recording machine, auxiliary speaker(s), conference calls, etc., the automatic switching of a tape, or other, recording machine as the telephone itself is simultaneously being switched on-off; and activation of a time-date recording machine at the start and termination of each phone call.
4. An arrangement to feed sound into the telephone instrument through a remote sound transmitter without the need to "wire-connect" to the telephone instrument. This alternative is employed if a "wired-connection" directly to the telephone instrument is deemed objectionable, inconvenient or otherwise undesirable.
5. An automatic switching (on-off) arrangement for the remote sound transmitter simultaneously as the telephone instrument itself is switched on-off; connection to have two, or more, nearby telephones "talk to each other" in a conference; and the maintenance of privacy of an incoming sound signal while conducting handsfree telephone usage; this taking place while still maintaining the capability of broadcasting that sound signal through an external speaker in the event such usage is desired.

Many modifications and variatings of the present invention are possible in light of the above teachings. It is, therefore, to be understood that within the scope of the appended claims, the invention may be practiced otherwise than as particularly described.

What I claim:

1. An apparatus for use with a telephone instrument and other equipment connected therewith, for simultaneous use in conjunction with the telephone instrument, such as: a timing device, a recording device, and the like; said instrument and equipment each having respective on-off switch means, said apparatus comprising: faceset means formed of a transmitter-receiver assembly and associated support means; said support means being provided as part of said assembly for supporting said assembly along a user's face, by positioning said transmitter in proximity to a user's mouth and said receiver in proximity to said user's ear and module means being operatively associated with said telephone instrument, other equipment, and faceset means, having on-off switch means and electrical circuitry providing electrical signals to said telephone instrument and the transfer of said signals between said faceset means and said telephone instrument; and mechanical linkage means, said linkage means being adapted to actuate said telephone instrument on-off switch means when said telephone instrument is placed in working relationship with said module means, to actuate said module means on-off switch means for controlling the operation of said faceset and other equipment in circuit relation to said telephone instrument.

2. An apparatus as claimed in claim 1 wherein: said module means is provided with electrical circuitry interfaced with input and output circuitry of said telephone instrument, said transmitter-receiver assembly being formed of a transmitter having an output signal fed into input circuitry of said telephone instrument and a receiver for receiving an output signal of said telephone instrument, enabling said faceset means to be operative with said telephone instrument when respective input and output signals are transmitted.

3. An apparatus as claimed in claim 1, wherein: said faceset means comprises first support means for supporting said receiver in proximity to said ear, and positioning means to position said transmitter in proximity to said user's mouth.

4. An apparatus as claimed in claim 1, wherein: said faceset means is formed of an elongated bridging member having a transmitter located at the mouthpiece at a first end and an earpiece formed at a second end; said earpiece being provided with a support member extending therefrom to seat at a user's ear; and a transverse member; said transverse member having a first end affixed to said bridging member extending therefrom along the user's face and further having concave means formed at a second end thereof, said concave means being positionable to rest on a user's nose to position said faceset means with respect to said user's mouth.

5. An apparatus as claimed in claim 4, wherein: said support member is reversible with respect to its position on said earpiece.

6. An apparatus as claimed in claim 4, wherein: said support member on said earpiece is formed of flexible material.

7. An apparatus as claimed in claim 4, wherein: said support member on said earpiece is formed of rigid material.

8. An apparatus as claimed in claim 4, wherein: said positioning means is defined by spring means disposed therein for engagement with said support member for fixing the relative position of said transverse support member with respect to said bridging member.

9. An apparatus as claimed in claim 4, wherein: said positioning means is removable from said transverse support member.

10. An apparatus as claimed in claim 4, wherein: said transverse support member is adjustable for providing support along its length in conformance with a user's nose and cheek portions of a user's face.

11. An apparatus as claimed in claim 1, wherein: said transmitter in said faceset mouthpiece is connected to said telephone instrument at points where said transmitter of said telephone instrument is connected.

12. An apparatus as claimed in claim 1, wherein: said module is formed of a housing having associated therewith a platform for positioning a telephone instrument having a handset and said mechanical linkage means comprising an extendable arm formed transversely of said module being operable with respect to a switch hook of a base of said telephone instrument when placed in proximity to said modulue; and pivotably actuated linkage means connected to said extendable arm for actuating said extendable arm with respect to said switch hook to effect a condition comparable to the presence or absence of a handset on said base.

13. An apparatus as claimed in claim 12, wherein: said linkage means is upwardly biased by spring means coacting therewith, said linkage means being connected to said extendable arm, being operable to define vertical traverse to said extendable arm in response to comparable movement of said linkage means; said linkage means being movable within a line of travel to latch with engagement means disposed therein during downward movement of said extendable arm with respect to said switch hook and delatch from said engagement means during upward movement of said extendable arm.

14. An apparatus as claimed in claim 12, wherein: a source of electrical energy is provided in said housing; speaker means is mounted below where the transmitter of said telephone instrument handset is positioned; an induction coil means mounted below where the receiver of said telephone instrument handset is positioned; amplifier means is in electrical circuit relation with said coil means and being energized by said source of electrical energy through closure of first switch means in circuit relation therewith, said first switch means moving from a closed to open contact state in response to downward movement of said mechanical linkage means; said coil means being adapted to transmit a signal received from said telephone instrument receiver to said amplifier and into associated output means in electrical circuit relationship therewith connected to said receiver of said faceset.

15. An apparatus as claimed in claim 14, wherein: said output means are first, second and third bridged jacks.

16. An apparatus as claimed in claim 15, wherein: said receiver of said faceset is plugged into any one of said first, second or third bridged jacks; said transmitter of said faceset is connected in a base of said telephone instrument to points of contact where said transmitter of said telephone instrument handset connect, to thereby form a parallel talk path therewith.

17. An apparatus as claimed in claim 15, wherein: said second and third jacks provide respective auxiliary output signals.

18. An apparatus as claimed in claim 1, wherein: said faceset transmitter comprises a microphone located at said mouthpiece.

19. An apparatus as claimed in claim 1, wherein: second, third, fourth and fifth switch means are provided to control on-off operation of telephone related devices to coincide with actuation of said first switch means, said switch means being connected to associated jacks; each of said switch means first through fifth, being actuated simultaneously by said mechanical linkage means.

20. An apparatus as claimed in claim 19, wherein: sixth switch means is provided in bridged circuit relation to said fifth switch means.

21. An apparatus as claimed in claim 19, wherein: said second and third switch means are leaf type switches movable from a closed to an open contact state in response to downward movement of said mechanical linkage means; said fourth switch means is adapted to move from an open to a closed state in response to downward movement of said mechanical linkage means; said fifth switch means being a leaf type switch cooperating with actuator means causing said fifth switch means to momentarily pulse during downward movement of said mechanical linkage means.

22. An apparatus for use with a telephone instrument as claimed in claim 19, wherein: transmitter means are connected to a second amplifier means as an input source, said second amplifier means being also connected to a source of electrical energy and to a speaker means located in said module means at an output of said second amplifier means, whereby sound originating from said second amplifier means is directed to said transmitter of said telephone instrument handset which rests on said module above said speaker means, and an induction coil means disposed in said module below said telephone instrument receiver is in electrical circuit relation to a first amplifier means, for transmitting an output signal from said fifth amplifier means directly to an earpiece of said faceset which is electrical circuit relationship with said first amplifier means after second or third switch means is acted upon by movement of said mechanical linkage means.

23. A faceset assembly comprising: an elongated member; a microphone transmitter at a first end of said elongated member; a receiver at a second end of said elongated member; support means positionable at a user's face as part of said assembly, said support means being defined by a support element disposed at a second end of said elongated member to seat at a user's ear; and a transverse member; said transverse member having a first end affixed to said elongated member extending therefrom along a user's face and further having concave means formed at a second end thereof, said concave means being positionable to rest on a user's nose to position said transmitter in proximity to a user's mouth and said receiver in proximity to said user's ear; and electrical circuitry to provide an output signal to said transmitter and an input signal to said receiver.

24. A faceset assembly comprising: an elongated member; a microphone transmitter disposed at one end of said elongated member; and support means comprised as part of said assembly for supporting said assembly on a user's nose and ear, said support means being defined by a support element disposed at a second end of said elongated member to seat at a user's ear; and a transverse member; said transverse member having a first end affixed to said elongated member extending therefrom along a user's face and further having concave means formed at a second end thereof, said concave means being positionable to rest on a user's nose enabling said user to position said microphone transmitter in proximity to said user's mouth.

* * * * *